US010938699B1

(12) United States Patent
Berman et al.

(10) Patent No.: US 10,938,699 B1
(45) Date of Patent: Mar. 2, 2021

(54) SYSTEMS AND METHODS FOR MONITORING AND ADDRESSING NETWORK PERFORMANCE ISSUES

(71) Applicant: Cisco Technology, Inc., San Jose, CA (US)

(72) Inventors: Adam Laufer Berman, San Francisco, CA (US); Nathaniel Brahms, San Francisco, CA (US); Eugene Yedvabny, San Mateo, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/589,794

(22) Filed: Oct. 1, 2019

(51) Int. Cl.
*H04L 12/26* (2006.01)
*H04L 12/24* (2006.01)

(52) U.S. Cl.
CPC ........ *H04L 43/0864* (2013.01); *H04L 41/147* (2013.01); *H04L 43/0888* (2013.01); *H04L 43/16* (2013.01)

(58) Field of Classification Search
CPC . H04L 43/0864; H04L 43/0876; H04L 43/16; H04L 43/0888; H04L 41/147
USPC .......................................................... 709/224
See application file for complete search history.

(56) References Cited

U.S. PATENT DOCUMENTS

| | | | |
|---|---|---|---|
| 8,166,164 B1* | 4/2012 | Luna | H04L 67/288 709/224 |
| 9,584,419 B1* | 2/2017 | Gilgur | H04L 47/11 |
| 2012/0166636 A1* | 6/2012 | Page | H04L 43/08 709/224 |
| 2014/0149572 A1* | 5/2014 | Menezes | H04L 43/12 709/224 |
| 2015/0156085 A1* | 6/2015 | Galanes | H04L 12/5691 709/224 |
| 2017/0262781 A1* | 9/2017 | Yang | G06Q 10/06395 |
| 2019/0082445 A1* | 3/2019 | Yang | H04W 72/12 |
| 2020/0204484 A1* | 6/2020 | Altman | H04L 47/125 |

* cited by examiner

*Primary Examiner* — Ruolei Zong
(74) *Attorney, Agent, or Firm* — Polsinelli PC

(57) ABSTRACT

Systems, methods, and computer-readable media are provided for determining a change in a state of performance of a given network application. In one aspect, a method includes receiving, at a network controller, a set of measurements for an application; determining, at the controller, a predicted goodput and an application response delay for the application; based on a comparison of each of the predicted goodput and the application response delay to a respective threshold, detecting a transition in state of performance of the application; and communicating the transition in the state of performance of the application to a network monitoring terminal.

20 Claims, 3 Drawing Sheets

SYSTEMS AND METHODS FOR MONITORING AND ADDRESSING NETWORK PERFORMANCE ISSUES

TECHNICAL FIELD

The present technology pertains in general to field of computer networking, and more particularly, to systems and methods for predicting performance states of network components and changes in the performance states.

BACKGROUND

Network operators spend significant time and effort on identifying performance problems within a network, the identification and prompt addressing of which can significantly reduce network operation costs and increase efficiency and proper operation thereof.

The performance of a network can fluctuate significantly over time and passive measurements only capture the performance at a moment of taking such measurements. Accordingly, it is not possible to predict, with high precision, the performance of the network over time and into the future and determine performance degradations to a point where there is a network problem that requires fixing or conversely determine performance improvements to a point that an existing network problem no longer exists.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
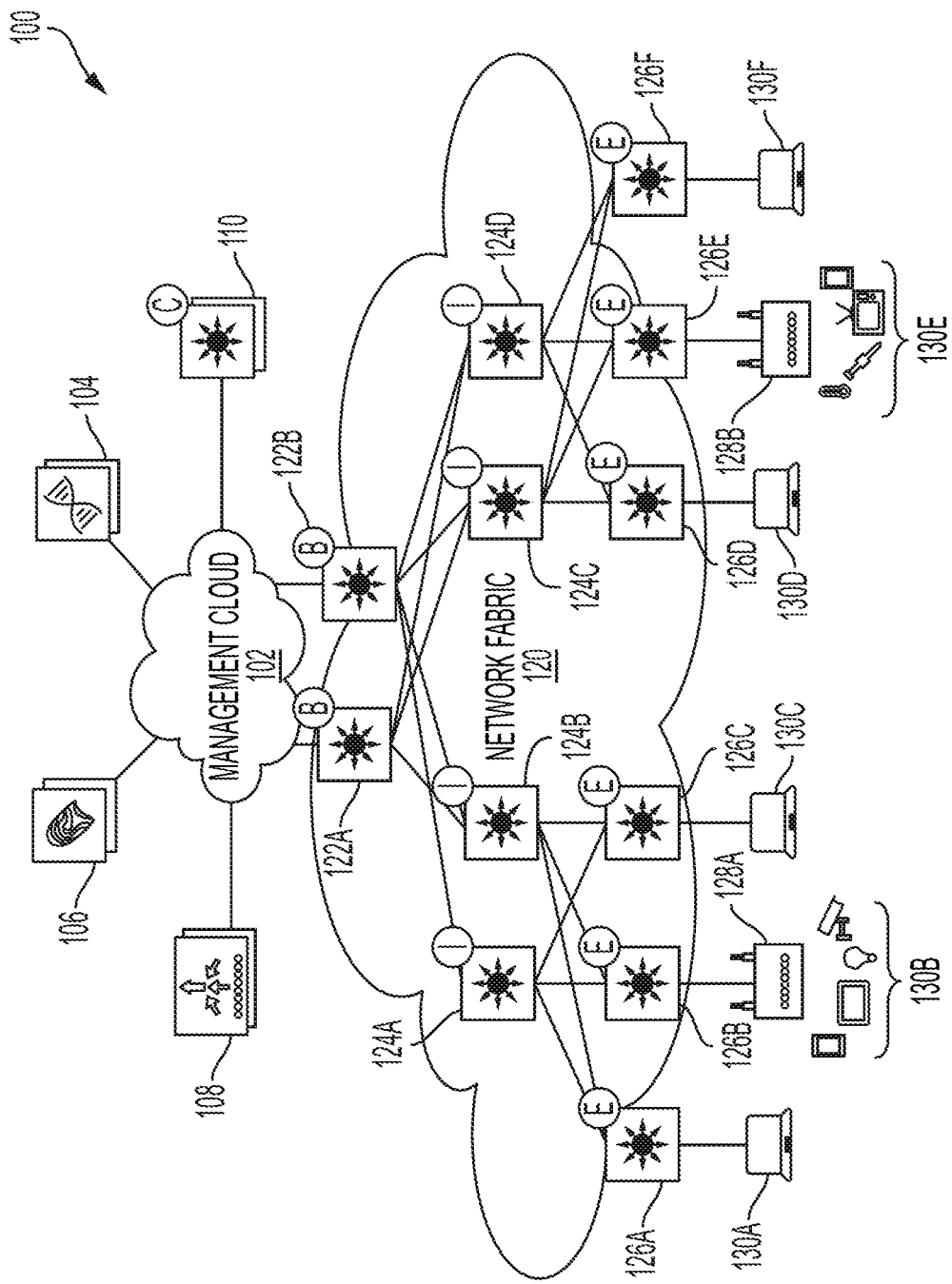
FIG. 1 illustrates an example of a physical topology of a network in accordance with one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

As noted above, performance of a network can fluctuate significantly over time and relying simply on passive measurements taken at a given point in time cannot adequately convey changes in network performance behavior over time. As will be described below in detail, the present disclosure provides a statistic model per network application tuple and upon receiving a new measurement for each application tuple the new measurement is added to previously stored values for the same network application and appropriately weighted. Such statistical model, produces, for a given timestamp, predicted performance indicators, which upon comparison with respective thresholds, can provide an indication of when the corresponding network application will undergo a transition in performance behavior (e.g., from bad performance to good performance and vice-versa).

In one aspect of the present disclosure, a method includes receiving, at a network controller, a set of measurements for an application; determining, at the controller, a predicted goodput and an application response delay for the application; based on a comparison of each of the predicted goodput and the application response delay to a respective threshold, detecting a transition in state of performance of the application; and communicating the transition in the state of performance of the application to a network monitoring terminal.

In another aspect, the method further includes determining a total number of flows received for the application at the network controller over a time period; and determining the predicted goodput and the application response if the total number of flows exceeds a flow threshold.

In another aspect, each respective threshold is application user specified.

In another aspect, the set of measurements includes application goodput at a given time stamp, application response time at the given time stamp, packet loss, latency, jitter and number of bytes sent over a fixed time interval.

In another aspect, the set of measurements is per application tuple.

In another aspect, the set of measurements are received from a network gateway component.

In another aspect, detecting the transition to be from a good performance state to a bad performance state is based on determining that the predicted goodput or the predicted application response delay does not meet the respective threshold, and detecting the transition to be from a bad performance state to a good performance state is based on determining the predicted goodput and the application response delay meeting the respective threshold for at least a number of consecutive iterations.

In one aspect of the present disclosure, a network controller includes memory having computer-readable instructions stored therein and one or more processors. The one or more processors are configured to execute the computer-readable instructions to receive a set of measurements for an application; determine a predicted goodput and an application response delay for the application; based on a comparison of each of the predicted goodput and the application response delay to a respective threshold, detect a transition in state of performance of the application; and communicate the transition in the state of performance of the application to a network monitoring terminal.

In one aspect of the present disclosure, one or more non-transitory computer-readable media comprising computer-readable instructions, which when executed by one or more processors of a network controller, cause the network controller to receive a set of measurements for an application; determine a predicted goodput and an application response delay for the application; based on a comparison of each of the predicted goodput and the application response delay to a respective threshold, detect a transition in state of performance of the application; and communicate the transition in the state of performance of the application to a network monitoring terminal.

DETAILED DESCRIPTION

The disclosure begins with a description of an example system in which the concepts of the present disclosure may be implemented in a controlled network of access points in a campus network that provide network connectivity to client devices connected thereto. Such network of access points may be managed by a network controller (e.g., a Dynamic Network Access Controller (DNAC), a Wireless Local Area Network Controller (WLC), etc., examples of which will be described below.

One example of operating a network includes intent-based networking, which is an approach for overcoming the deficiencies of conventional networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
|---|---|
| I need to scale out my application database | Extend network segments; update load balancer configuration; configure quality of service (QoS) |
| I have scheduled a telemedicine session at 10 am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of a network in accordance with one aspect of the present disclosure. It should be understood that, for network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, network 100 can include any number or type of resources, which can be accessed and utilized by endpoints or network devices. The illustrations and examples provided herein are for clarity and simplicity.

In this example, network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other example embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others. In some example embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some example embodiments, the AAA appliance(s) 106 can utilize Remote Authentication Dial-In User Service (RADIUS) or Diameter to communicate with devices and applications. In some example embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some example embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some example embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 125A-F (collectively, 125). Although the fabric control plane node(s) 110 are shown to be external to the network fabric 120 in this example, in other example embodiments, the fabric control plane node(s) 110 may be co-located with the network fabric 120. In example embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv5, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 125 and provide the Layer 3 underlay for fabric overlay traffic.

The fabric edge nodes 125 can connect endpoints to the network fabric 120 and can encapsulate/decapsulate and forward traffic from these endpoints to and from the network fabric. The fabric edge nodes 125 may operate at the perimeter of the network fabric 120 and can be the first points for attachment of users, devices, and things and the implementation of policy. In some example embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 125 for communication to outside subnets.

In some example embodiments, all subnets hosted in a fabric site can be provisioned across every fabric edge node 125 in that fabric site. For example, if the subnet 10.10.10.0/24 is provisioned in a given fabric site, this subnet may be defined across all of the fabric edge nodes 125 in that fabric site, and endpoints located in that subnet can be placed on any fabric edge node 125 in that fabric. This can simplify IP address management and allow deployment of fewer but larger subnets. In some example embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

Network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 125A, 125C, 125D, and 125F, respectively, and the wireless endpoints 130B and 130E can connect wirelessly to wireless access points 128B and 128B (collectively, 128), respectively, which in turn can connect by wire to fabric edge nodes 125B and 125E, respectively. In some example embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some example embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 125. The AP VXLAN tunnel can carry segmentation and policy information to and from the fabric edge nodes 125, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 125. Next, the wireless endpoints 130 can obtain IP addresses for themselves via Dynamic Host Configuration Protocol (DHCP). Once that completes, the fabric edge nodes 125 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
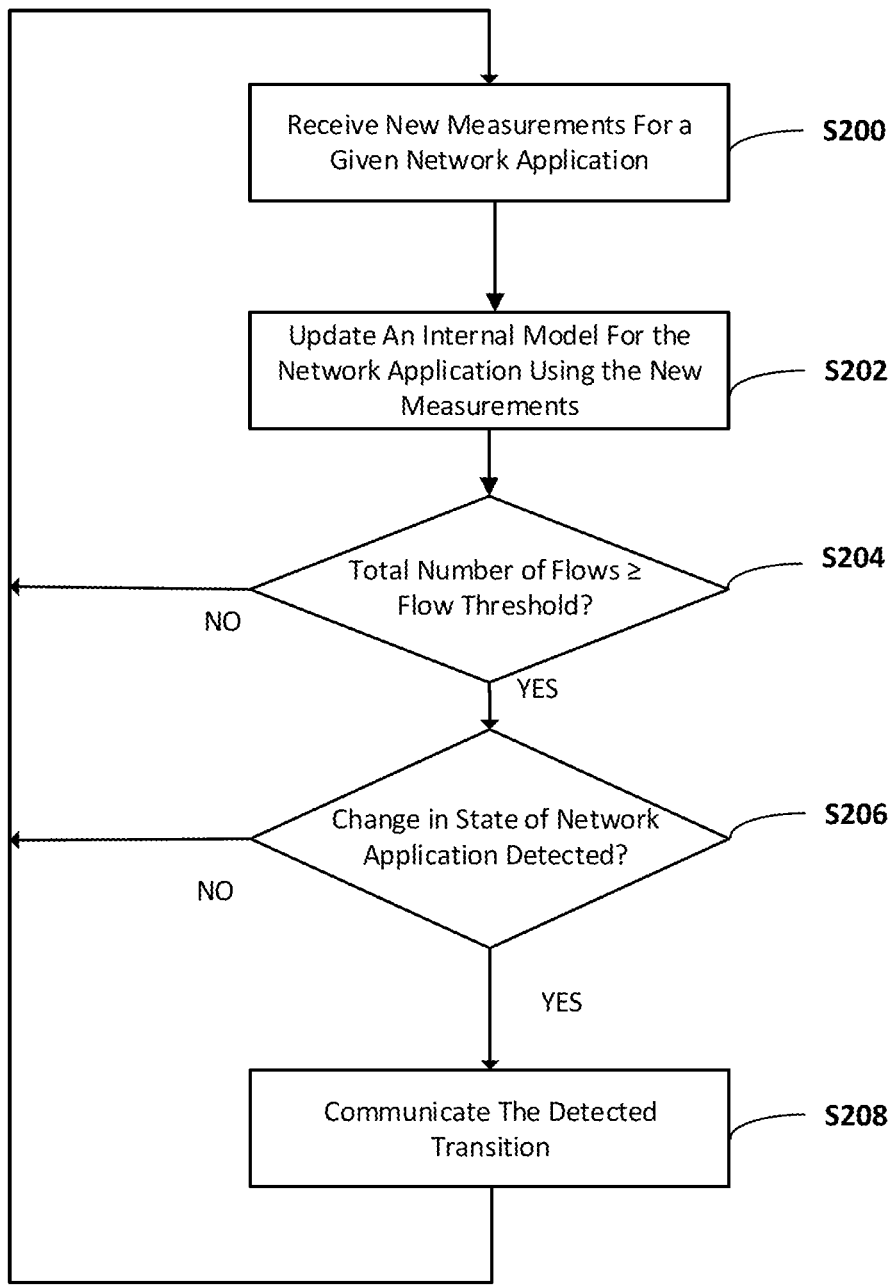
FIG. 2 is an example method of monitoring network performance and addressing related performance issues, according to an aspect of the present disclosure.

FIG. 2 is an example method of monitoring network performance and addressing related performance issues, according to an aspect of the present disclosure.

FIG. 2 will be described from perspective of network controller appliance 104 of FIG. 1. However it will be understood that network controller appliance 104 may have one or more memories storing computer-readable instructions, which when executed by one or more processors, cause the one or more processors to implement functionalities of FIG. 2. Network controller appliance 104 may be a Meraki® server developed by Cisco Technologies, Inc. of San Jose, Calif. In describing FIG. 2, network controller appliance 104 may be referred to as controller 108.

At S200, controller 104 receives a new measurement for a given network application over a fixed time interval (e.g., 5 minutes, 15 minutes, an hour, a day, a week, etc.), where duration of the fixed time interval may be an adjustable parameter determined based on experiments and/or empirical studies. Such new measurement may be received per network application tuple, where a network application tuple may be defined as a 5-tuple that identifies a piece of web traffic flow (e.g., TCP flow) with its source and destination. As an example, a 5-tuple for a network application includes source IP address, source port, destination IP address, destination port and protocol.

An example of a web traffic flow can be an one endpoint 130 connected to network 100 requesting a web application such as Google Calendar. Endpoint 130 sends the request, via network 100 (local area network (LAN)) and subsequently wide area network, to a Google server and receives an acknowledgement of the request (not the actual data for Google Calendar but a simple acknowledgement). This request and the received acknowledgement is an example of an instance of a web traffic flow. An example of a separate flow would be the Google server sending the Google calendar to the endpoint 130 and the endpoint 130 acknowledging the receipt thereof. As can be seen, there can be thousands to millions to even billions of such measurements that can be collected and sent to controller 104 over the fixed time interval.

Controller 104 may receive the new measurement from any given component of network 100 (e.g., access points 128, fabric nodes 122, 124, 126, etc.) As noted above, each of fabric nodes 122, 124 and 126 can be one of Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126. Furthermore, access points 128 can be one of Cisco Aironet® access points, Cisco Meraki® MR access points, and/or other Cisco DNA™-ready access points, etc. can operate as the wireless access points 128 a probe request from endpoint 204-1 to associate (connect) to access point 202-1 (first access point). Because the new measurements are received as observed by a network component, these measurements may be referred to as passive measurements.

Examples of new (passive) measurements received for each flow of a network application include but are not limited to, goodput, the application response delay, and the number of network flows over that time interval that made up the measurement, jitter, number of bytes sent, data packet loss, maximum segment size value, application layer request and response timings, etc.

In one example and using goodput as a sample of a new measurement, goodput (G) of a TCP flow may be determined according to formula (1) shown below:

$$G = C \frac{MSS}{RTT\sqrt{P_{loss}}} \quad (1)$$

In formula (1), C is an order of unity constant dependent on a congestion-control algorithm and distribution of loss, MSS is the flow's maximum segment size, RTT is the flow's round-trip time and $P_{loss}$ is the probability of packet loss. In one example, goodput (G) can be determined both upstream and downstream relative to a gateway of network 100 via which an endpoint 100 sends a request for a network application. In other words, goodput (G) can be determined both on LAN side as well as WAN side.

In another example and using application response time (Art) as a sample of a new measurement, ART of a TCP flow may be determined according to formula (2) shown below:

$$ART = T_{resp} - T_{req} - RTT^{WAN} \quad (2)$$

In formula (2) above, $T_{req}$ is the time at which the last bite of the request (e.g., request for Google calendar) is observed, $T_{resp}$ is the time at which the first byte of the response (e.g., acknowledgement from Google Calendar server) is observed and $RTT^{WAN}$ is the round-trip time upstream of the gateway (round-trip time over WAN).

In one example, new measurements received for various network applications and associated with various components of network 100 may be separated into buckets based on flows' clients, servers, requested domains, WAN uplink, VLAN tag, etc. Separating measurements into buckets allows for controller 104 to identify a source of a problem with a network application (e.g., whether the problem is on LAN side or WAN side, whether the problem with a given network application is with a single server or several identifiable servers, whether the problem is a single poor performing internet link, etc.).

At S202, controller 104 updates an internal model, available to controller 104 for each network application tuple, using all of the received new measurements over the fixed time internal. Each measurement (e.g., where each measurement includes, but is not limited to, goodput, the application response delay, and the number of network flows over that time interval that made up the measurement, jitter, number of bytes sent, data packet loss, maximum segment size value, application layer request and response timings, as described above) may have a value in the internal model, which is updated as will be described below.

Controller 104 merges (adds) the value of each parameter in the newly received measurement to a weighted previously stored value. For example, the goodput and application response delay may have an already stored value known to controller 104. Controller 104 may then weight each of the goodput and application response delay's stored value with a fixed parameter (the value of the fixed parameter may be determined based on experiments and/or empirical studies). Controller 104 may then add the newly received values/measurements for goodput and application response delay to the respective weighted stored value. The resulting value may then be further weighted by the total number of flows in the new measurement (total number of flows over the fixed time internal throughout which new measurements are received), and then divided total by the sum of all the weights. Since the uncertainty of the performance measurement is directly correlated with the number of flows observed over the fixed time internal, adjustment is needed for measurements with many flows and thus low uncertainty, as well as measurements with few flows and thus high uncertainty. By weighting the past value with a fixed constant, controller 104 prevents that value from decaying too quickly if new measurements only contain a few flows, allows it to be essentially entirely replaced if the measurement contains many flows, and provides a sort of sliding scale between the low and high number of flows extremes.

A mathematical formula used for updating the internal model using the newly received passive measurements, as described above, is given by formula (3) below:

$$F_i = \frac{F_i w_H + z_i w_i}{w_H + w_i} \quad (3)$$

In formula (3), $F_i$ is the filter output (e.g., predicted goodput, predicted application response delay, etc.) for the ith analysis window (e.g., fixed time interval over which the new measurements were received at S200), $z_i$ is the ith available goodput or ART sample, $w_H$ is a static weighting for historical data (e.g., the constant described above with reference to S204), and $w_i$ is a weighting for the ith sample. When $w_i \gg w_H$, the filter output instantly takes on the new measured value, and when $w_i \ll w_H$, the filter becomes an exponentially weighted average with decay interval approximately equal to $w_H/w_i$ analysis windows.

Weights in formula (3) are determined/chosen to maintain a constant degree of confidence in the filter output based on the number of observed packets within an analysis window (fixed time interval). The number of observed flows are selected as a proxy for the number of packets (e.g., each observed flow in the system contains an average of seven data packets). Typically, the variance in ART and RTT (described above with respect to formula (1) and (2)) is low compared to the observed value, and therefore the historical weighting is chosen based on the number of packets needed to precisely observe packet loss. An assumption is made that loss is binomially distributed, and precision is demanded such that, when true loss is 1%, loss≥5% fewer than one in every ten thousand reported measurements. This equates to approximately 70 observed data packets, so $w_H = 70$ packets. The number of observed packets is determined based on the number of observed flows. A conservative measure of data packets per flow (for applications transmitting infrequent, small exchanges) in the system is 3.5, so an alternatively value for $w_H$ is 20 flows.

At S204, controller 104 determines if a total number of flows (observed and for which measurements are received at S200) over the fixed time interval is equal to or exceeds a flow threshold, where the flow threshold may have a configurable value that can be determined based on experiments and/or empirical studies. If the total number of flows observed over the fixed time interval does not exceed the flow threshold, then the process reverts back to S200 and controller 104 repeats S200 to S204. Once the total number of flows observed over the fixed time interval is equal to exceeds the flow threshold, then at S206, controller 104 determines if the state of the network application has changed (if a transition in the state of the network application from bad performance to good performance or from good performance to bad performance, is detected).

In one example, controller 104 determines that there is a change in the state of the network application if any of the predicted outputs of the internal model (indicative of, for example, goodput or application response delay at a given timestamp) exceeds a corresponding threshold (e.g., corresponding goodput and application response delay thresholds). For example, a goodput threshold may be set to 160 Kbps or the application response delay threshold may be set to 3 seconds. Therefore, if the predicted goodput is less than 160 kbps, then controller 104 may determine that the corresponding network application has transitioned from good performance to bad performance. While one time violation of such threshold may be sufficient to conclude a transition of a network application from a good performance state to a bad performance state, controller 104 may implement more conservative approaches for concluding a transition back to good performance by a previously identified bad performing application. For example, controller 104 may requires that the predicted goodput and/or the predicted application response delay meet or exceed their corresponding thresholds at least a threshold number of consecutive predictions/iterations concluding that an application has transitioned from a bad performing state back to acceptable/good performing application.

In another example, controller 104 may require that all thresholds or a majority thereof be violated (or met) before concluding transitioning of an application from good performance to bad performance (or conversely from bad performance to good performance). In other words, in the example above, controller 104 may requires that both goodput and application response delay thresholds be violated (or met) before concluding a transition in performance state for an application.

In another example, network operators may provide conditions and thresholds that are used by controller 104 to make a determination as to whether an application has transitioned from one state to another or vice-versa.

Accordingly, if at S206, controller 104 determines that there is a change/transition in state of performance of a network application detected, then at S208, controller 104 may communicate that transition to a network operator via a corresponding network monitoring terminal (desktop, tablet, mobile phone, etc.) connected to network 100 for network operator to take appropriate actions. However, if controller 104 does not detect/determine a change/transition in the state of performance of the network application at S206, then the process reverts back to S200 and controller 104 repeats S200 to S206 as described above.

After performing S208, the process of FIG. 2 may be repeated periodically. In one example, measurements collected over a period of time (which is greater than the fixed time period of S200), may be discarded. For example, measurements may be discarded after a week, 8 days, 10 days, a month, etc.

Figure 3:
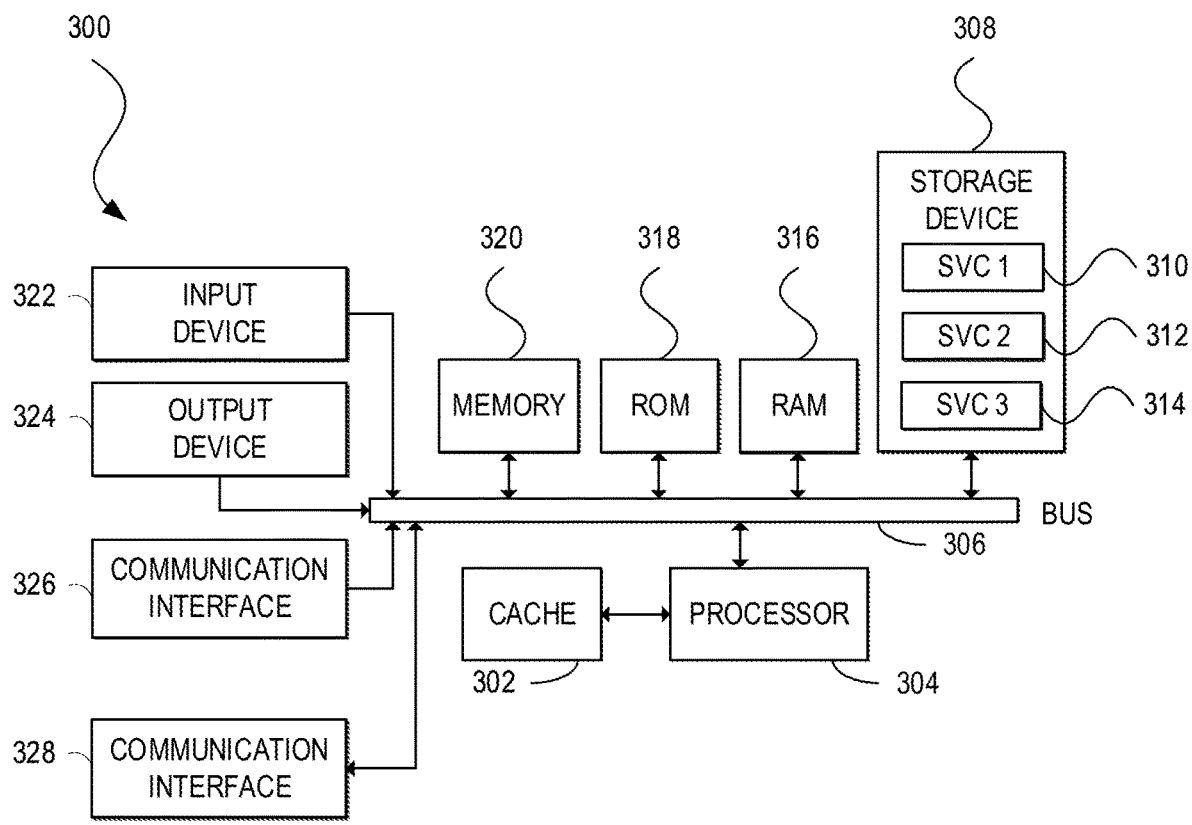
FIG. 3 illustrates an example system including various hardware computing components, according to an aspect of the present disclosure.

With various examples of the present disclosure described above with reference to FIGS. 1 and 2, the disclosure now turns to FIG. 3, which describes example system and hardware components that can be used to implement any one of endpoints 130, access points 128, routers 122, 124 and 126, WLC 108, controller 104, etc.

FIG. 3 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 3 illustrates a system bus computing system architecture (system) 300 wherein the components of the system are in electrical communication with each other using a connection 306. Exemplary system 300 includes a cache 302 and a processing unit (CPU or processor) 304 and a system connection 306 that couples various system components including the system memory 320, such as read only memory (ROM) 318 and random access memory (RAM) 316, to the processor 304. System 300 can include a cache of high-speed memory connected directly with, in close proximity to, or integrated as part of the processor 304. System 300 can copy data from the memory 320 and/or the storage device 308 to the cache 302 for quick access by the processor 304. In this way, the cache can provide a performance boost that avoids processor 304 delays while waiting for data. These and other modules can control or be configured to control the processor 304 to perform various actions. Other system memory 320 may be available for use as well. The memory 320 can include multiple different types of memory with different performance characteristics. The processor 304 can include any general purpose processor and a service component, such as service (SVC) 1 310, service (SVC) 2 312, and service (SVC) 3 314 stored in storage device 308, configured to control the processor 304 as well as a special-purpose processor where software instructions are incorporated into the actual processor design. The processor 304 may essentially be a completely self-contained computing system, containing multiple cores or processors, a bus, memory controller, cache, etc. A multi-core processor may be symmetric or asymmetric.

To enable user interaction with system 300, an input device 322 can represent any number of input mechanisms, such as a microphone for speech, a touch-sensitive screen for gesture or graphical input, keyboard, mouse, motion input, speech and so forth. An output device 324 can also be one or more of a number of output mechanisms known to those of skill in the art. In some instances, multimodal systems can enable a user to provide multiple types of input to communicate with system 300. The communications interface 326 can generally govern and manage the user input and system output. There is no restriction on operating on any particular hardware arrangement and therefore the basic features here may easily be substituted for improved hardware or firmware arrangements as they are developed.

Storage device 308 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 316, read only memory (ROM) 318, and hybrids thereof.

System 300 can include an integrated circuit 328, such as an application-specific integrated circuit (ASIC) configured to perform various operations. The integrated circuit 328 can be coupled with the connection 306 in order to communicate with other components in system 300.

The storage device 308 can include software services (SVC) 310, 312, 314 for controlling the processor 304. Other hardware or software modules are contemplated. The storage device 308 can be connected to the system connection 306. In one aspect, a hardware module that performs a particular function can include the software component stored in a computer-readable medium in connection with the necessary hardware components, such as the processor 304, connection 306, output device 324, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving, at a network controller, a set of measurements for an application;
   determining a total number of flows received for the application at the network controller over a time period;
   in response to the total number of flows exceeding a flow threshold, determining, at the controller, a predicted goodput and an application response delay for the application;
   based on a comparison of each of the predicted goodput and the application response delay to a respective threshold, detecting a transition in state of performance of the application; and
   communicating the transition in the state of performance of the application to a network monitoring terminal.

2. The method of claim 1, wherein each respective threshold is application user specified.

3. The method of claim 1, wherein the set of measurements includes application goodput at a given time stamp, application response time at the given time stamp, packet loss, latency, jitter and number of bytes sent over a fixed time interval.

4. The method of claim 1, wherein the set of measurements is per application tuple.

5. The method of claim 1, wherein the set of measurements are received from a network gateway component.

6. The method of claim 1, wherein
   detecting the transition to be from a good performance state to a bad performance state is based on determining that the predicted goodput or the predicted application response delay does not meet the respective threshold, and
   detecting the transition to be from a bad performance state to a good performance state is based on determining the predicted goodput and the application response delay meeting the respective threshold for at least a number of consecutive iterations.

7. The method of claim 1, wherein the time period is adjustable.

8. A network controller comprising:
   memory having computer-readable instructions stored therein; and
   one or more processors configured to execute the computer-readable instructions to:
   receive a set of measurements for an application;
   determine a total number of flows received for the application at the network controller over a time period;
   in response to the total number of flows exceeding a flow threshold, determine a predicted goodput and an application response delay for the application;

based on a comparison of each of the predicted goodput and the application response delay to a respective threshold, detect a transition in state of performance of the application; and communicate the transition in the state of performance of the application to a network monitoring terminal.

9. The network controller of claim 8, wherein each respective threshold is application user specified.

10. The network controller of claim 8, wherein the set of measurements includes application goodput at a given time stamp, application response time at the given time stamp, packet loss, latency, jitter and number of bytes sent over a fixed time interval.

11. The network controller of claim 8, wherein the set of measurements is per application tuple.

12. The network controller of claim 8, wherein the set of measurements are received from a network gateway component.

13. The network controller of claim 8, wherein the one or more processors are configured to:

detect the transition to be from a good performance state to a bad performance state based on determining that the predicted goodput or the predicted application response delay does not meet the respective threshold, and detect the transition to be from a bad performance state to a good performance state based on determining the predicted goodput and the application response delay meeting the respective threshold for at least a number of consecutive iterations.

14. One or more non-transitory computer-readable media comprising computer-readable instructions, which when executed by one or more processors of a network controller, cause the one or more processors to:

receive a set of measurements for an application;

determine a total number of flows received for the application at the network controller over a time period;

in response to the total number of flows exceeding a flow threshold, determine a predicted goodput and an application response delay for the application;

based on a comparison of each of the predicted goodput and the application response delay to a respective threshold, detect a transition in state of performance of the application; and communicate the transition in the state of performance of the application to a network monitoring terminal.

15. The one or more non-transitory computer-readable media of claim 14, wherein each respective threshold is application user specified.

16. The one or more non-transitory computer-readable media of claim 14, wherein the set of measurements includes application goodput at a given time stamp, application response time at the given time stamp, packet loss, latency, jitter and number of bytes sent over a fixed time interval.

17. The one or more non-transitory computer-readable media of claim 14, wherein the set of measurements is per application tuple.

18. The one or more non-transitory computer-readable media of claim 14, wherein the execution of the computer-readable instructions by the one or more processors further cause the one or more processors to:

detect the transition to be from a good performance state to a bad performance state based on determining that the predicted goodput or the predicted application response delay does not meet the respective threshold, and detect the transition to be from a bad performance state to a good performance state based on determining the predicted goodput and the application response delay meeting the respective threshold for at least a number of consecutive iterations.

19. The one or more non-transitory computer-readable media of claim 14, wherein the set of measurements are received from a network gateway component.

20. The network controller of claim 16, wherein the time period is adjustable.

* * * * *